(12) United States Patent
Perrault

(10) Patent No.: US 6,203,253 B1
(45) Date of Patent: Mar. 20, 2001

(54) RIVET DRILL-OUT GUIDE

(76) Inventor: Jamie A. Perrault, 232 Dorn Ave., Everett, WA (US) 98208

(*) Notice: Subject to any disclaimer, the term of this patent is extended or adjusted under 35 U.S.C. 154(b) by 0 days.

(21) Appl. No.: 09/447,169

(22) Filed: Nov. 22, 1999

Related U.S. Application Data

(60) Provisional application No. 60/109,864, filed on Nov. 24, 1998.

(51) Int. Cl.[7] .................................................. B23B 49/00
(52) U.S. Cl. ............................................ 408/84; 408/202
(58) Field of Search ........................................ 408/84, 202

(56) References Cited

U.S. PATENT DOCUMENTS

| | | | |
|---|---|---|---|
| 554,443 | * 2/1896 | Henry | 408/202 |
| 1,023,002 | 4/1912 | Bennett | 408/84 |
| 2,296,087 | 9/1942 | Burns, Jr. | 408/84 |
| 2,359,859 | * 10/1944 | Jarvis | 408/202 |
| 2,383,953 | * 9/1945 | Beard | 408/84 |
| 2,576,786 | * 11/1951 | Gray et al. | 408/84 |
| 3,060,772 | * 10/1962 | Crump | 408/202 |
| 4,802,798 | * 2/1989 | Adamson | 408/202 |
| 5,228,811 | 7/1993 | Potter | 408/84 |
| 5,318,390 | 6/1994 | DalBianco | 408/84 |

* cited by examiner

Primary Examiner—Steven C. Bishop
(74) Attorney, Agent, or Firm—Todd N. Hathaway

(57) ABSTRACT

A tool for use with a power drill for removal of rivets in light alloy panels and other structures. A hollow, cylindrical drill cage is mountable to the bottom of a tool body having a reciprocating drive shaft. A drill bit which is mounted on the lower end of the drive shaft extends downwardly through the cage and passes through a guide bushing at the lower end thereof. The guide bushing has an axial bore for receiving and guiding the drill bit, a central socket for receiving and holding the head of the rivet, and a broad annular surface which extends around the socket so as to engage the surrounding material and stabilize the tool and bit perpendicular thereto. The drill cage has port openings formed in the sides thereof for discharge of shavings which are pulled upwardly by operation of the bit, and a channel is also formed across the annular stabilizing surface for discharge of chips and shavings therethrough. The penetration depth of the drill is adjustable by rotating the drill cage on the threaded tool body, and a plurality of teeth on the upper edge of the drill cage selectively engage corresponding teeth on a locking ring on the body so as to lock the cage in position and prevent unintended rotation. The reciprocating drive shaft may be yieldingly biased towards the upper, retracted position. The body of the tool may be formed by a modified body an adjustable depth counter-sink tool.

13 Claims, 3 Drawing Sheets

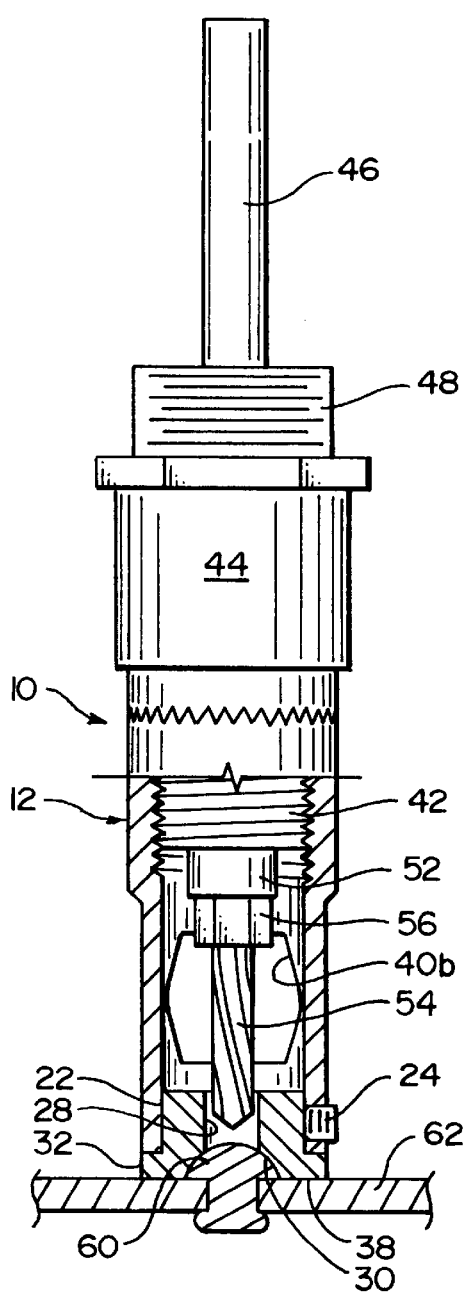
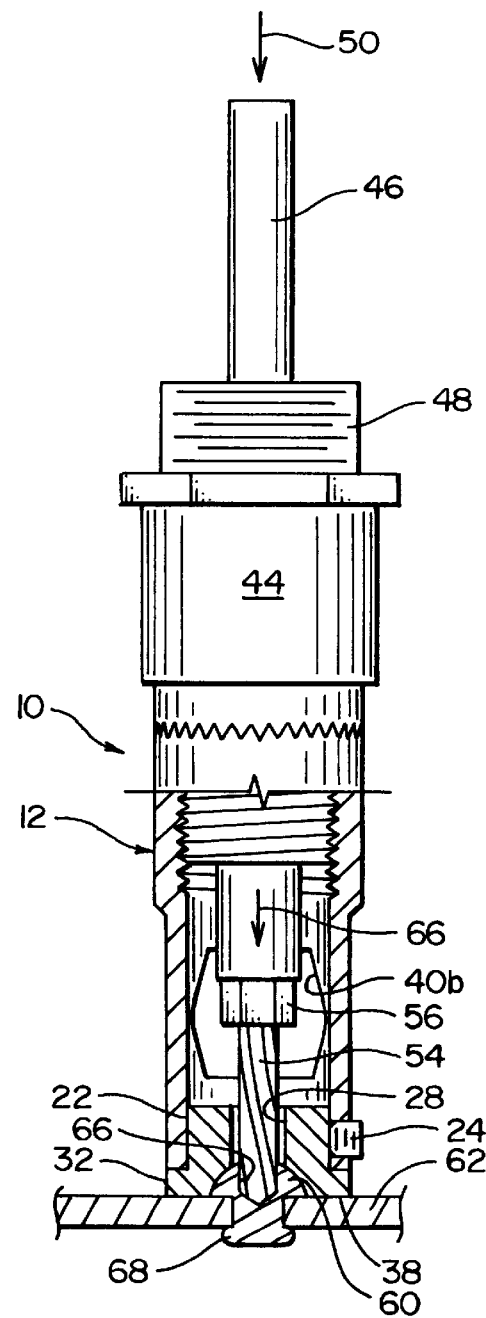

FIG. 4
FIG. 5
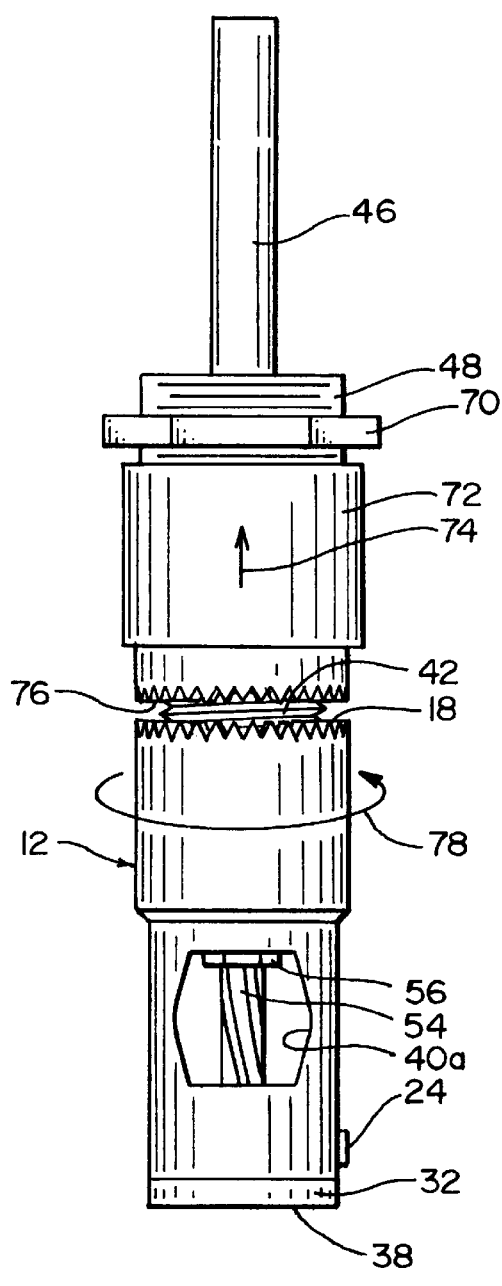
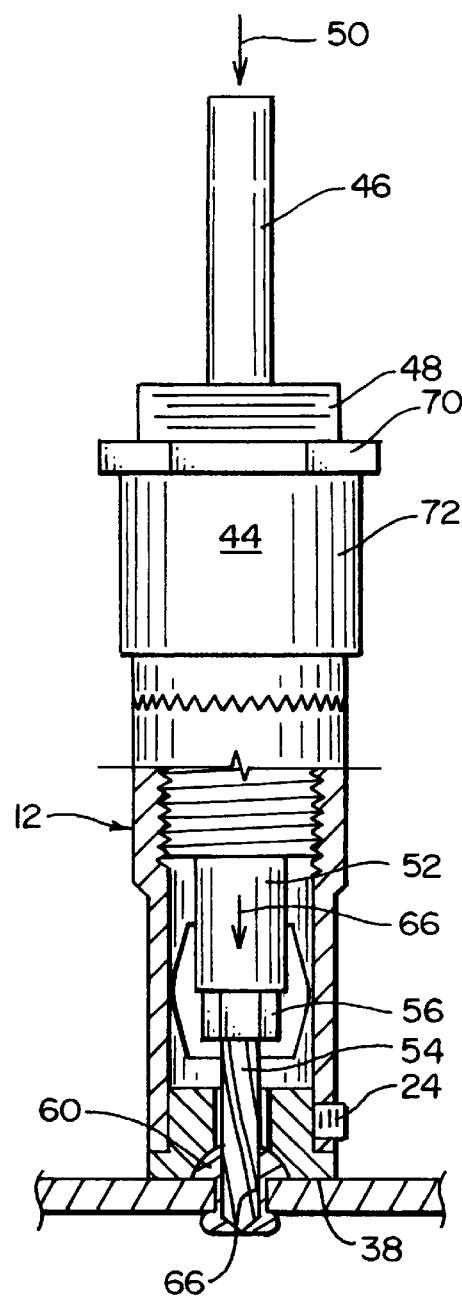

RIVET DRILL-OUT GUIDE

PRIOR APPLICATIONS

This application claims the benefit of U.S. Provisional Application Ser. No. 60/109,864 filed on Nov. 24, 1998.

BACKGROUND OF THE INVENTION a. Field of the Invention

The present invention relates generally to drills and similar boring tools, and, more particularly, to a guide adaptor for facilitating removal of rivets using a hand-held power drill.

b. Background Art

In various types of assemblies, it is necessary to remove rivets from aluminum or sheet metal panels for maintenance, inspection, repair and so on. This is particularly true in the aircraft industry, where literally hundreds of rivets must be drilled out in order to periodically remove alloy panels from wing surfaces, fuselage exteriors, and other parts of the aircraft.

As can be seen in FIGS. 2 and 3, a typical rivet of the type which is used to secure light alloy panels includes a domed upper head portion which engages the outer surface of the panel, and a shaft portion which extends through a bore formed in the panel or panels. At its lower end, the shaft of the rivet is flared or "mushroomed" outwardly into engagement with the inner surface of the panel.

In order to remove a rivet, a hole is drilled in the center of the head and partway along the length of the shaft, leaving a "donut" which is sheared off by applying pressure in a lateral direction using a chisel or similar tool. The shaft then drops or is pushed out of the bore so that the remainder of the rivet falls out on the opposite side of the panel.

While simple in theory, this is in fact a fairly painstaking process. Firstly, the diameter of the drill bit must be quite close to that of the shaft of the rivet, only just slightly undersized, or else insufficient material will be bored out for the head of the rivet to be knocked off with a clean blow; if the head does not come off easily and requires extensive chiseling/hammering, this can easily result in damage to the surrounding panel. At the same time, however, the operator must be very careful that the drill bit does not cut into the material of the panel surrounding the bore; while the bore can be drilled out and fitted with an oversized rivet if damaged, this is inconvenient and inefficient, and for structural reasons only a small amount of enlargement is allowed before the panel must be discarded.

Hence, proper removal requires very precise alignment of the drill bit with the shaft of the rivet. Moreover, the rivet must be drilled to a fairly exact depth, since too shallow a bore will remove insufficient material, whereas a bore which extends too far into the shaft of the rivet will leave a thin annular wall or sleeve of material adjacent the surface of the panel, which will tend to collapse and bend when struck with a chisel, rather than breaking off with a clean shear.

The conventional technique for removing rivets in keeping with these requirements has been to "eyeball" the center of the rivet head, and then mark this with a center punch. The operator then presses the bit of a power tool against the head of the rivet, while carefully holding the drill perpendicular to the panel so that the bit is aligned coaxially with the shaft of the rivet. This is an extremely tedious process, and achieving satisfactory results is highly dependent on operator experience and skill; even then, a skilled operator can easily make a mistake, especially at the end of a long and tiring shift. Consequently, since an average commercial aircraft contains hundreds of thousands of rivets, drilling these out for routine panel removal is an extraordinarily labor intensive and time-consuming process, especially since a single slip of the drill or misalignment can damage a part worth many thousands of dollars.

Over the years, a number of prior rivet drill-out tools have been proposed, such as the examples which are shown in the following U.S. patents: U.S. Pat. No. 1,023,002 (Bennett); U.S. Pat. No. 2,296,087 (Burns, Jr.); U.S. Pat. No. 5,228,811 (Potter); and U.S. Pat. No. 5,318,390 (DalBianco). All of these references show devices having a drill guide and a spring-loaded return mechanism, however none has provided a completely satisfactory solution to the problems noted above. For example, the Bennett patent shows a device in which the cutter rests on the rivet head and is actually larger in diameter than the rivet shaft, for trimming off the edges of the head; while this may have been satisfactory for use with the heavy steel/cast iron plates which were prevalent at the time of the Bennett patent, this device would inevitably cause unacceptable surface damage if used with modern light-alloy panels.

The remaining patents (DalBianco, Potter, and Burns, Jr.) show rivet drill-out tools which are intended to avoid damage to the surrounding structure, but again none of these is entirely satisfactory. For example, in each instance the head of the rivet is received in a generally hemispherical recess in the tip of the tool, with the result that it is very difficult for the operator to keep the drill from tipping out of alignment with the rivet shaft. Also, none of the devices includes a convenient and precise means for adjusting the travel of the bit: In Burns, Jr., depth of the bit is limited by a distance between a shoulder and bearing plate, but this distance is not easily adjustable for bit wear or different sizes of rivet heads; DalBianco, in turn, uses a simple collar and set screw very similar to conventional drill bit depth gauges, which are notoriously prone to slippage and difficult to adjust with any degree of precision.

In practice, the various problems which have been experienced with prior rivet drill-out tools have been so severe that in some instances workers have purposely discarded the devices out of frustration, reverting to their traditional techniques. Moreover, these devices have invariably employed some form of specially-constructed tool body, which has added greatly to their cost. Consequently, the industry has until now been unable to find any satisfactory solution to the problem of quickly, efficiently, and economically removing rivets from lightweight alloy panels.

Accordingly, there exists a need for a rivet drill-out tool which will enable an operator to maintain the bit of a power drill in a stable, coaxial relationship with the rivet as the bit penetrates the head and shaft thereof. Furthermore, there exists a need for such a tool in which the depth of penetration is adjustable in a convenient and precise manner. Still further, there exists a need for such a tool which can be provided as an adaptor for an existing form of tool body, so as to avoid the need for a special tool body and thereby reduce cost of manufacturing the tool.

SUMMARY OF THE INVENTION

The present invention has solved the problems cited above, and is a guide assembly for drill-out removal of rivets.

In a preferred embodiment, this comprises a guide attachment which is threadingly mounted to lower end of a tool body, the tool body having a rotatable drive shaft mounted for axially reciprocating motion therein. The guide attachment has a drill cage for accommodating a lower end of the drive shaft for vertical movement therethrough, and a guide bushing is mounted to a lower end of the cage. The guide bushing has a socket for receiving the head of a rivet therein and a vertical bore for passage of the drill bit therethrough in axial alignment with the rivet head. The guide bushing also includes a broad, annular stabilizing surface which surrounds the socket, and which extends in a plane perpendicular to the axis of the drill bit so that the bit is maintained in a perpendicular orientation relative to the panel surface.

The drill cage may comprise means for interchangeably mounting a plurality of the guide bushings therein. The drill cage may also comprise a plurality of ports positioned above the guide bushing for outward discharge of metal shavings therethrough. The ports preferably extend upwardly to the upper end of the drill bit for unobstructed outward discharge of shavings which have been pulled upwardly thereby.

The guide attachment may further comprise means for selectively adjusting the depth of penetration of the drill bit, relative to the bottom surface of the bushing. The means for adjusting the depth may be the threaded engagement between the guide attachment and the tool body, whereby the position of the attachment relative to the end of the drill bit will move axially in response to rotation of the attachment on the body.

There may also be means for locking the attachment in a selected position along the tool body. The means for locking the attachment in position may be a non-rotatable collar member which is mounted for axial sliding movement to an upper portion of the tool body, and means for selectively engaging a lower end of the locking sleeve and an upper end of the guide attachment. The engagement means may be a plurality of cooperating teeth formed on the ends of the locking sleeve and guide attachment. Means may also be provided for biasing the locking sleeve into locking engagement with the guide attachment so as to prevent inadvertent rotation of the sleeve and attachment during use of the tool.

The invention, together with further aspects and advantages thereof, may be further understood by reference to the following detailed description and accompanying drawings.

BRIEF DESCRIPTION OF THE DRAWINGS

FIG. 2 is a side, elevational view, partly in cross-section, showing the guide attachment of FIG. 1 mounted to a spring-loaded tool body, with the assembly being positioned atop a rivet in preparation for removal thereof;

FIG. 3 is an elevational view similar to FIG. 2, showing the shaft of the tool assembly having been depressed under downward pressure exerted by the operator, so that the drill bit penetrates the head and shaft of the rivet;

FIG. 4 is an elevational view of the tool assembly of FIGS. 2–3, showing the upper locking ring having been retracted for adjustment of the drilling depth by rotating the guide attachment on the tool body; and FIG. 5 is an elevational, partially cross-sectional view, similar to FIG. 3, showing the drill bit penetrating to a second, greater depth following adjustment of the tool assembly in the manner which is shown in FIG. 4.

DETAILED DESCRIPTION

Figure 1:
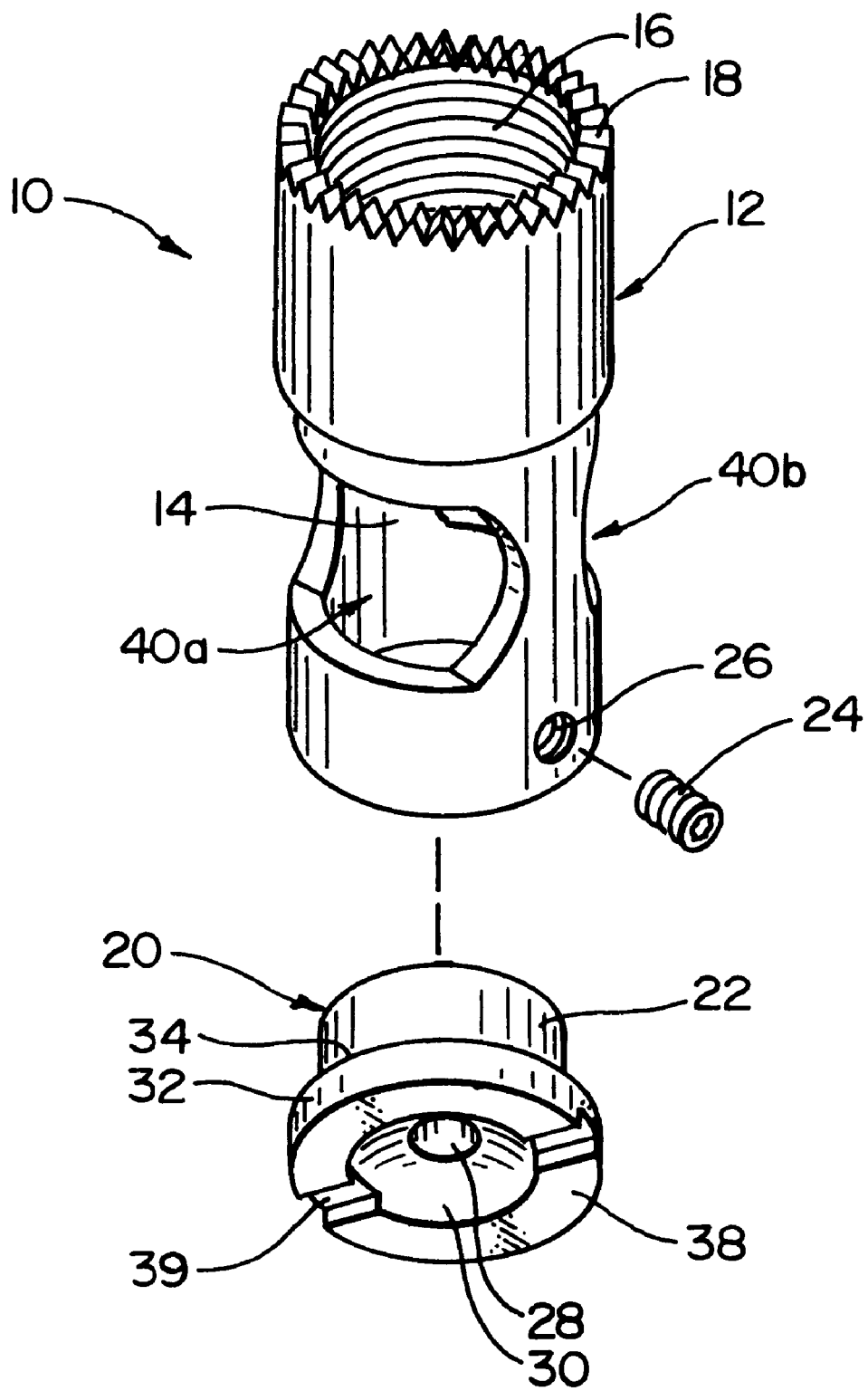
FIG. 1 is a perspective view showing a guide attachment in accordance with the present invention, with the guide bushing being removed from the bottom of the attachment and rotated 90° so as to show the socket and annular stabilizing surface thereof.

As will be described in greater detail below, the present invention provides a guide tool for drilling out rivet heads, which in a preferred embodiment is formed as an attachment or adaptor which is mountable to the modifying body of a pre-existing form of adjustable countersink tool. In those embodiments where a pre-existing type of tool body is employed, the overall cost of producing the tool is greatly reduced.

Accordingly, FIG. 1 shows a guide adaptor 10 in accordance with a preferred embodiment of the present invention. As can be seen, this includes a hollow, cylindrical drill cage 12 having a vertical bore 14 for coaxial passage of the drill bit therethrough, the upper end of the drill cage being provided with an internally threaded bore 16 and toothed rim 18.

An interchangeable guide bushing 20 is mounted at the bottom of the adaptor 10. This has an upper boss 22 which fits closely within the bore 14 of the drill cage, and which is secured therein by means of a set screw 24 which is threaded through a transverse bore 26. The bushing is provided with a central, axial bore 28 which is aligned coaxially with the drill cage, and which has a diameter closely matching that of a predetermined size of drill bit. The lower end of the axial bore 28 is centered at the top of an upwardly concave socket 30 which is formed in the bottom of the bushing, and which is surrounded by a base flange 32 which extends outwardly to the outer wall of the cylindrical cage. The upper surface 34 of the base flange abuts the bottom edge of the drill cage, and the bottom surface of the flange thus forms a broad, flat stabilizing ring 38 around the socket 30.

As can be seen in FIG. 1, a chip relief groove 39 is preferably formed transversely across the face of the stabilizing ring 38 to permit the outward escape of metal chips and shavings; for use with an average-sized rivet and bit, the chip relief groove may suitably be a ⅛"×⅛" channel cut across the lower face of the bushing 20. First and second ports 40a, 40b are also formed in the sides of the drill cage above the guide bushing 20 for the outward discharge of shavings. As can perhaps best be seen in FIG. 2, the discharge ports are comparatively large and extend over most of the interior height of the drill cage, so that the upper edges thereof are positioned proximate the upper end of the drill bit. As opposed to smaller ports near the bottom of the cage, this configuration has the advantage of facilitating the discharge of chips/shavings which are drawn upwardly along the shaft of the bit due to its rotation, thus avoiding the tendency for these to build up and become compacted in the interior of the cage. The large size of the ports, and their elongation about the circumference of the cage, also provides the operator with a comparatively clear view for visual inspection of the condition of the drill-bit.

As can be seen in FIG. 2, the upper end of the drill cage 12 screws onto the bottom of the threaded barrel 42 of a spring-loaded tool body 44. In the preferred embodiment which is shown, the tool body is modified from that of a conventional countersink tool, such as are available from several manufacturers (e.g. Zephyr Manufacturing Inc., Inglewood, Calif.), with the counterbore attachment which normally threads onto barrel 42 having been removed. The body includes an axially extending drive shaft 46 which is free to reciprocate in a housing 48. The housing encloses a coil spring (not shown) which is compressed as the drive shaft is depressed, in the direction indicated by arrow 50, so that the shaft is resiliently biased in the return direction. The drive shaft is of a conventional size for being engaged by power drill (e.g., a hand-held pneumatic or electric drill), and extends vertically through the housing to downwardly projecting lower end 52. A drill bit 54 is threaded into a bore formed in the lower end of the drive shaft, the bit having a hexnut fitting 56 attached to its upper end to facilitate attachment/detachment. Rotation of the drive shaft 46 by the drill motor thus causes simultaneous rotation of the bit 54. It should be noted that the threaded bit attachment (as opposed to a fixed diameter sleeve) in combination with the interchangeable guide bushings rendors changing bit sizes very easy and convenient.

In use, the assembly is placed over a selected rivet, so that the head 60 of the rivet is received in socket 30. The contour of the socket is configured to match and fit closely against the head of the rivet, thereby preventing any lateral shifting between the two. The broad, annular stabilizing ring 38, in turn, rests flat against the surface of the panel 62 all around the rivet, in a plane perpendicular to the axes of the rivet and drill bit. The engagement of the stabilizing ring against the panel, and the receiving socket against the rivet head, thus quickly and easily establishes the proper orientation of the components, and effectively stabilizes the assembly with the bit extending perpendicular to the panel and in precise coaxial alignment with the rivet shaft. Moreover, very little effort is required on the part of the operator in order to maintain this alignment.

Once the tool has been brought into engagement with the rivet, the operator simply activates the drill motor and applies pressure in the direction towards the panel, as indicated by arrow 50, so that this overcomes the return spring and depresses the drive shaft in the direction indicated by arrow 66 in FIG. 3. As this is done, the drill bit 54 is forced downwardly through the guide bushing 20, with the close-fitting inner surface of bore 28 cooperating with the outer surface of the bit to keep the bit in alignment with the shaft of the rivet. To provide a firm guiding action and positive control over the motions of the drill bit, the diameter of the guide bore 28 is preferably sized to form a close-tolerance fit between the bit and the bushing, and the bushing may be formed of hardened tool steel to resist development of wear or "slop" from repeated contact between the two.

As the drive shaft is pressed downwardly against the compression spring, the bit 54 on its lower end cuts a bore 66 through the head and shaft of the rivet, moving downwardly towards the flared lower end 68. A stop within the tool body 44 limits the downward motion of the bit, preferably at a point where its tip lies just at or slightly below the surface of the panel member (see FIG. 3), which allows the head to be sheared off cleanly after the tool has been withdrawn.

The internal stop provides the drive shaft 46 with a set range of motion within the upper tool body 44. The lower limit of this range of motion (and therefore the lowermost extension of the drill bit) is adjustable relative to the bottom of the guide attachment, by changing the axial location of the adaptor along tool body 40. As can be seen in FIG. 4, this is accomplished by backing off a lock nut 70 which is threaded onto the upper end 48 of the tool body, so as to allow a locking sleeve 72 to be withdrawn upwardly in the direction indicated by arrow 74. The locking sleeve 72 is non-rotating and is mounted to the tool body for sliding movement (using a longitudinal key-way, for example); the sleeve is also preferably spring-loaded, so as to be yieldingly biased in the direction opposite arrow 74.

As the locking sleeve is withdrawn upwardly, the teeth 76 along the lower edge thereof are moved out of engagement with the corresponding teeth 18 on the upper edge of drill cage 12. This frees the drill cage to be turned on the threaded barrel 42 of the tool body, as indicated by arrow 78. The axial position of the drill cage and attachment shifts along the tool body in response to this rotation (upwardly in the example which is shown in FIGS. 4–5), thereby moving the bottom surface of the stabilizing ring 38 upwardly or downwardly relative to the lower limit of travel for the drill bit 54. When the desired amount of adjustment has been achieved, the locking sleeve 72 is released so that the two sets of teeth 76, 18 snap back together, preventing any further change in position of the attachment. The lock nut 78 is then threaded back down against the upper end of the locking sleeve so as to prevent the two sets of teeth from moving apart when the tool is in use.

The change in the position of the drill cage produces a corresponding change in the depth to which the end of the drill bit will penetrate, relative to the bottom surface of the stabilizing ring 38. In the example which is shown in FIG. 5, the drill cage has been moved to a higher position along the threaded barrel of the tool body, thereby raising the guide bushing relative to the end of the drill bit. Thus, while the drill bit still moves downwardly by the same distance relative to the tool body, it penetrates to a deeper point along the shaft of the rivet, as can be seen by comparison of FIGS. 5 and 3 (as was noted above, it is unusual for an operator to wish to drill deeply into the shaft of the rivet, and so it will be understood that the view in FIG. 5 is presented mainly for purposes of illustrating operation of the tool).

As compared with the prior devices described above, the adjustment described above is made very conveniently and quickly, by simply rotating the parts within one's fingers; furthermore, the relatively fine pitch of the threads and large number of locking teeth enable the operator to make fine, accurate depth adjustments.

Moreover the assembly is easily adapted for use with different sizes and shapes of rivets, many kinds of which can be found in a single aircraft or other structure. For example, a plurality of guide bushings may be provided which are interchangeably mountable in the lower end of the drill cage, each of which is provided with a socket which is sized, shaped or otherwise specifically configured to fit a particular type of rivet. The diameter of the guide bore 28 can also be varied by using different bushings for different sizes of rivets. Moreover, the drill bit 54 is also interchangeable, by simply unthreading this from the lower end 52 of the drive shaft and replacing it with a different size of bit.

Although the present invention has been described herein with reference to a preferred embodiment in which the tool is configured as an adaptor which is mountable to the body of an existing form of counter-sink tool, which provides the economic advantages described above, it will be understood that in other embodiments the entire assembly may be in the form of a tool having a body which is specifically constructed for this purpose. Furthermore, it will be understood that in other embodiments of the present invention there may be an adaptor unit which is configured to be mountable to a different type or make of counter-sink body, rather than a particular example which has been shown and described herein.

It is to be recognized that various alterations, modifications, and/or additions may be introduced into the constructions and arrangements of parts described above without departing from the spirit or ambit of the present invention.

What is claimed is:

1. An attachment for removing a rivet from a bore in a panel, said attachment being mountable to a modified body of an adjustable countersink tool having a vertically reciprocating drive shaft and comprising:

a generally cylindrical, hollow drill cage having an upper end for threadingly engaging an exterior of said modified body so that a vertical position of said drill cage is selectively adjustable by rotating said drill cage on said body, and a lower end having a narrow annular lip;

a drill bit which is mountable to a lower end of said drive shaft so that said bit extends downwardly through said hollow interior of said drill cage, said drill bit having a diameter equal to or just slightly smaller than that of a shaft of said rivet; and a guide bushing which is mountable to a lower end of said drill cage, said guide bushing comprising:

an annular flange portion having an outer edge which does not project outwardly substantially beyond said annular lip on said lower end of said drill cage, said flange portion having a broad, flat, base surface that extends inwardly from said outer edge of said flange portion for resting in stabilizing engagement against a surface of material surrounding said rivet;

an axial guide bore having a diameter that closely matches said diameter of said drill bit, so that said guide bore maintains axial alignment of said drill bit with said shaft of said rivet and ensures that said bit is confined within said bore in said panel as said bit passes therethrough; and a socket formed centrally in said base surface for receiving a head of said rivet therein and maintaining said shaft of said rivet in coaxial alignment with said axial bore and said drill bit which is guided therethrough.

2. The attachment of claim 1, wherein said drill cage further comprises:

first and second openings formed on opposite sides of said cylindrical cage and extending vertically to at least proximate an upper end of said drill bit so as to permit unobstructed lateral discharge of shavings which are pulled upwardly along said bit in response to rotation thereof.

3. The attachment of claim 1, wherein said cylindrical drill cage further comprises:

a plurality of teeth formed on an upper end of said drill cage for selectively engaging a plurality of teeth on a lower end of a non-rotating locking ring on said body, so as to prevent unintended rotation of said drill cage thereon.

4. The attachment of claim 1, wherein said guide bushing further comprises:

a cylindrical boss portion that projects upwardly from said flange portion for being slidingly received in said hollow interior of said cylindrical drill cage, said boss portion having an outside diameter that closely matches said inside diameter of said drill cage so as to form a close-fitting sliding engagement between said bushing and said drill cage.

5. The attachment of claim 4, further comprising:

means for selectively retaining said guide bushing in said lower end of said hollow, cylindrical drill cage.

6. The attachment of claim 5, wherein said means for selectively retaining said guide bushing comprises:

a set screw threaded through a transverse bore in said drill cage so as to bear against said boss portion of said quick bushing when said boss portion is received in said lower end of said drill cage.

7. The attachment of claim 1, wherein said guide bushing further comprises:

first and second substantially diametrically opposed channels formed in said lower surface of said flange portion for discharge of shavings therethrough.

8. The attachment assembly of claim 1, wherein said diameter of said axial bore in said guide bushing is sized sufficiently small to form a close-tolerance fit between said bushing and bit as said bit passes therethough, said guide bushing being formed of steel having a hardness selected relative to that of said drill bit so as to resist development of wear from repeated contact with said bit.

9. The attachment assembly of claim 1, wherein said drill cage further comprises:

a toothed edge portion having a plurality of teeth formed on said upper end of said drill cage for selectively engaging corresponding teeth formed on said body of said tool so as to prevent unintended rotation of said cage on said body.

10. A guide bushing for removing a rivet from a bore in a panel, said guide bushing being detachably mountable to a hollow, cylindrical drill cage mounted on a body of a countersink tool and comprising:

an annular flange portion having an outer edge which does not project outwardly substantially beyond a narrow annular lip on a lower end of said drill cage, said flange portion having a broad, flat base surface that extends inwardly from said outer edge of said flange portion for resting in stabilizing engagement against a surface of material surrounding said rivet;

a guide bore formed axially through said bushing, said bore having a diameter that closely matches said diameter of a drill bit mounted on said countersink tool so that said guide bore maintains axial alignment of said drill bit with a shaft of said rivet and ensures that said bit is confined within said bore in said panel as said bit passes therethrough; and a socket formed centrally in said base surface for receiving a head of said rivet therein and maintaining said shaft of said rivet in coaxial alignment with said axial bore and said drill bit which is guided therethrough.

11. The guide bushing of claim 10, further comprising:

a cylindrical boss portion that projects upwardly from said flange portion for being slidingly received in an interior of said hollow, cylindrical drill cage, said boss portion having an outside diameter that closely matches an inside diameter of said drill cage so as to form a close-fitting sliding engagement between said bushing and said drill cage.

12. The guide bushing of claim 10, wherein said flange portion of said bushing further comprises:

first and second substantially diametrically opposed channels formed in said base surface of said flange portion for discharge of shavings therethrough.

13. The guide bushing of claim 10, wherein said diameter of said axial bore in said guide bushing is sized sufficiently small to form a close-tolerance fit between said bushing and bit as said bit passes therethough, said guide bushing being formed of a steel having a hardness selected relative to that of said drill bit so as to resist development of wear from repeated contact with said bit.

* * * * *